3,015,227
UNION AND GAS CHROMATOGRAPHY
COLUMN PORT
Herbert H. Barber, Jr., La Marque, Tex., assignor, by mesne assignments, to Standard Oil Company, Chicago, Ill., a corporation of Indiana
Filed Dec. 6, 1957, Ser. No. 701,094
7 Claims. (Cl. 73—23)

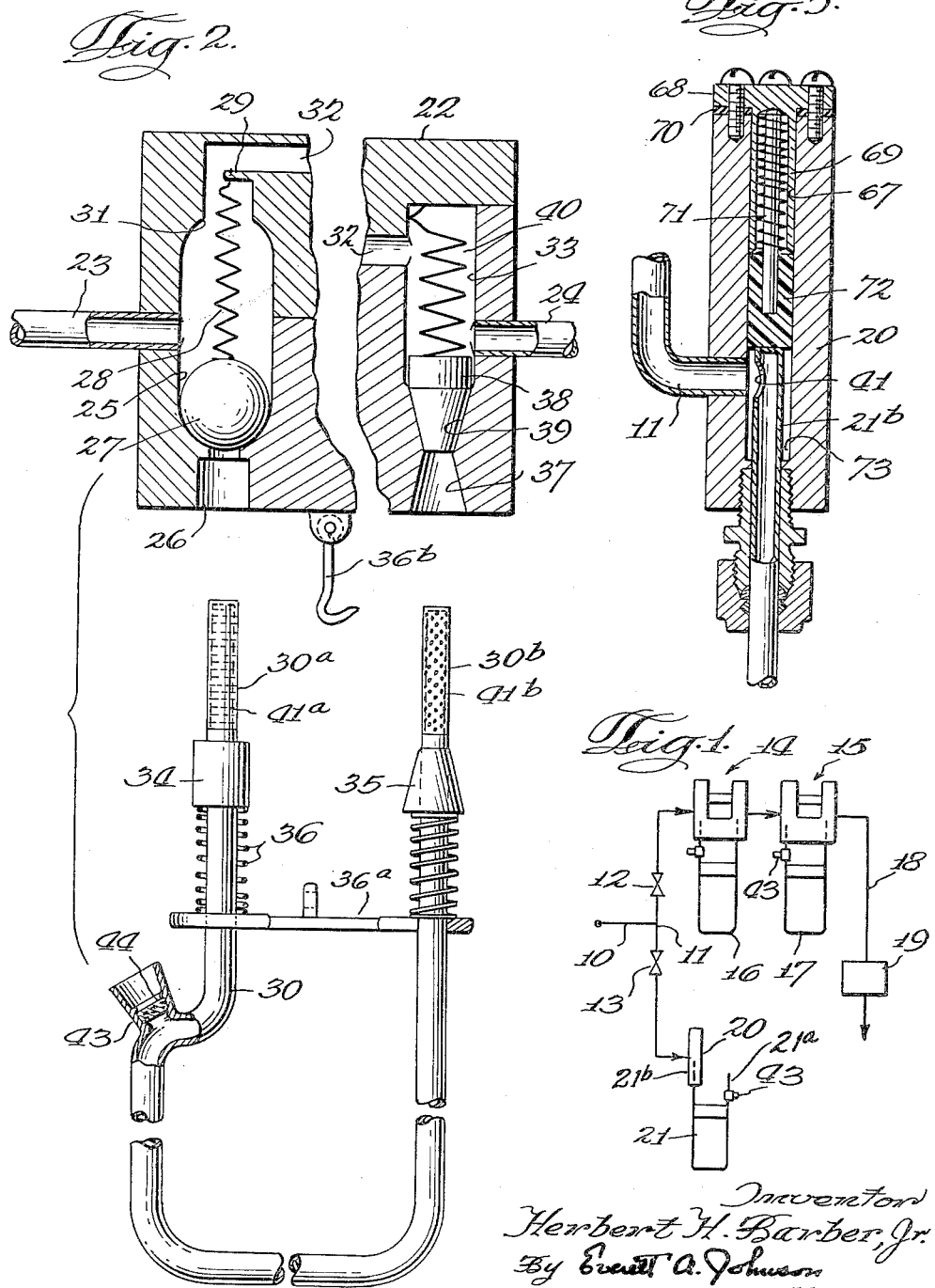

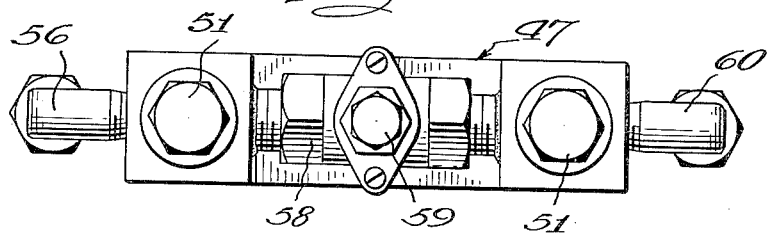

This invention relates to systems for separating complex mixtures and more particularly relates to controlling the flow of fluids in a gas chromatographic analysis system.

Gas chromatography is rapidly becoming established as a useful technique in the separation and analysis of complex mixtures of volatile materials. The system separates such mixtures into its components in a simple and relatively inexpensive manner. The analysis can be made in a relatively short time and can be applied to both micro samples and to plant stream monitoring. The technique is applicable to wide boiling range samples.

Separations take place in small packed columns in which the packing comprises a stationary liquid phase on a finely divided inert solid. Components of a sample are separated as they are carried through the column by moving gas phase, called the carrier or eluting gas, and the components of the sample are determined as they pass out of the column through a sensitive detector, such as a thermal conductivity cell. Nitrogen, helium, hydrogen and carbon dioxide are common eluting gases.

Rapid separation and identification of the light components in gasolines and similar products may be obtained by providing two chromatographic columns in series. The first column acts to retain the heavier components and the light fraction passes on to the second column for analysis.

The columns are eluted with an inert carrier gas which causes the components to move forward with individual velocities which are less than that of the carrier gas and the velocity with which a particular component moves is dependent upon its partition coefficient. As the partition coefficient varies for different components, a separation into zones results within the columns. The heavier components retained in the first column are removed so as to prevent interfering with the light components in subsequent analyses and this may be accomplished by back-flushing with carrier gas during the chromatographic separation of the light fraction in the second column.

In some separations it may be desired to collect light, intermediate or heavy fractions of a given mixture for subsequent separation of the components of each fraction. In other operations separations may be predominately by individual components with some grouping of other components. In either situation if it is desired to separate such fractions or such groups into individual components, and for such purpose it is desired to rearrange or transfer a given column so that it may be placed in series or parallel with other columns of the same or different type or to be transferred to an eluting zone of different characteristics such as temperature and rate of flow of eluting gas.

In order to manipulate the columns and to facilitate the detailed analysis of the components it is necessary to provide valves and union devices for bypassing, back-flushing, and the like. It is with respect to such union and valve devices that this invention relates.

It is, therefore, a primary object of my invention to provide an apparatus which is adapted for multi-column operations. A further object of the invention is to provide an apparatus which permits the utilization of chromatographic columns in a versatile and fool-proof manner. Still another object of the invention is to provide a system which is adapted for rapid and efficient separations of difficultly separated mixtures having a wide boiling range. A more specific object of the invention is to provide a combination valve-union device whereby chromatographic columns may be introduced and/or removed from a system with minimum interference of the gas flow through the system. A further object is to provide a purge gas valve which is self-closing and adapted for back-flushing of chromatographic columns. These and other objects of the invention will become apparent as the description proceeds.

Briefly, according to my invention, I provide a combination valve-union device which eliminates lubrication problems and minimizes dead space volumes. It provides a continuous passage way with a flow of gas whether the chromatographic column be in place or not and can be operated at elevated temperatures.

I employ the use of spring-loaded port closures in conjunction with column terminals which seal the column to the entry ports of the valve-union device by simply pushing the two ends of the column thereinto.

The device provides for alternate closure of the column entry ports and for opening a bypass channel for the flow of gas through the device when the column is disengaged. A flow restriction in the bypass channel can be adjusted to balance the pressure drop through the column and the channel. When the column is inserted into the column entry ports, the spring-loaded closures are moved against the spring action to close the normally open bypass channel and at the same time permit the flow of gas through lateral openings provided adjacent the terminal ends of the chromatographic column. This allows for nearly instantaneous flow of gas through the column and removal of the column automatically restores the closures to their original position and re-establishes flow of gas through the bypass channel. Thus, essentially continuous and uniform gas flow is assured through the device whether the columns are in place or not.

To effect the purging or back-flushing of a column, I provide a single cylinder purge gas valve which normally blocks the flow of carrier gas. However, insertion of one end only of the column into the purge gas valve forces the entry port closure above a side port thereby allowing carrier gas to flow through the purge gas valve, through the column, and into the atmosphere. Removal of the end of the column automatically cuts off the flow of purge gas.

Further details and advantages of my system will be described by reference to the accompanying drawings wherein—

FIGURE 1 is a diagrammatic illustration of a system embodying my valve-union device and purge gas valve;

FIGURE 2 is an elevation, partly in section, of one embodiment of the apparatus;

FIGURE 3 is an elevation, partly in section, of another embodiment of the invention;

FIGURE 4 is a plan view of the apparatus in FIGURE 3; and

FIGURE 5 is a vertical section of the purge gas valve illustrated diagrammatically in FIGURE 1.

Referring to FIGURE 1, the carrier gas is supplied by line 10 to manifold line 11 having flow control valves 12 and 13. Combination valve-union devices 14 and 15 support chromatographic columns 16 and 17, the second valve-union device 15 discharging by line 18 through the detector 19 which is vented to the atmosphere. The purge gas valve 20 is adapted to receive a column 21 (similar to column 16) for back-flushing through a product recovery trap or detector, discarded, or analyzed in other columns.

Ordinarily the back-flushing of a column 21 can take place during the analysis being made by means of other columns 16 and 17. In making the analysis of the components from the second column 17, the first column 16 is ordinarily removed and attached to the purge gas valve 20.

In FIGURE 2, the valve-union device comprises a housing 22 having an inlet conduit 23 and outlet conduit 24. A first valve chamber 25 in housing 22 is provided with a column entry port 26 which is normally closed by ball piston 27 by means of spring 28 mounted on anchor post 29. When the inlet column end 30a passes through the entry port 26, the ball piston 27 is raised against the action of the spring 28 to close the valve port 31 in the upper end of chamber 25 and thereby prevent flow through the bypass channel 32 leading to the second valve chamber 33. Gaskets 34 and 35 on the column ends 30a and 30b seal the column entry ports 26 and 37.

The column 30 in FIGURE 2 is urged upwardly through column entry ports 26 and 37 into the housing 22 by means of springs 36, yoke 36a embracing the column 30 and contacting the lower ends of the coil springs 36. A hasp 36b is fixed to the housing 22 and restrains the yoke 36a in opposition to the springs 36. This arrangement maintains the gaskets 34 and 35 within the column entry ports 26 and 37.

When the outlet column end 30b of the column 30 passes through the second column entry port 37, it lifts the tapered piston 38 from the valve seat 39 against the action of spring 40, exposing the outlet port 24 and preventing flow through bypass line 32 in the valve-union device 22. The terminal portions 30a and 30b of the column 30 are closed at their ends and provided with lateral wall ports 41 which may comprise slots 41a or perforations 41b and through which the carrier gas flows in entering and leaving the columns 16, 17, 21 and 30.

The sample to be analyzed is introduced by sample entry port 43 which may be sealed by a serum cap 44. The sample is injected, for example, from a syringe having a needle which is projected through the serum cap 44.

In FIGURES 3 and 4, I have illustrated details of the valve-union device shown at 14 and 15 in FIGURE 1. This union and valve arrangement includes a pair of identical valve chambers 45 and 46 in housing 47, comprising two housings 47a and 47b, supported by bracket 48. Each valve unit comprises housing 47a or 47b, a chamber 45, a column entry port 50 at one end of the chamber 45, a removable threaded cap 51 containing a cavity 52 adapted to receive the spring 53 and the guide stem 54 on the plug 55. Intermediate to the ends of the chamber 45 are the carrier gas inlet duct 56 and the inlet 57 to the bypass channel 58 which is provided with a needle flow control valve 59. The bypass channel 58 discharges through bypass outlet 57a into a valve chamber 46 in housing 47b constructed similar to the valve unit in housing 47a as described.

Gas chromatographic column 16 of FIGURE 3 includes the lateral port 41 adjacent the inlet portion of the column 16, the sample entry port means 62, coupling 63 and a bracing member 64. When the two ends 16a and 16b of the column 16 are projected through the entry ports 50 and 65, the plug 55, preferably made of Teflon, is raised within chamber 45 to close bypass channel 58 and to expose the lateral port 41 to receive the flow of carrier gas from line 56.

The upper ends 16a and 16b of the chromatographic column 16 are secured to the valve-union assembly 14 or 15 by means of the threaded couplings 63 which are adapted to slidably receive the terminal ends 16a and 16b of the gas chromatographic column 16, 17, 21 or 30. Accordingly, the column in question can be removed, added, or interchanged by loosening the threaded coupling joints 63 and withdrawing the column downwardly whereby the springs 53 force the Teflon plugs 55 downwardly to expose the bypass inlet 57 and outlet 57a and restore direct flow from line 56 to line 60 through the channel 58 whereby the analysis is continued in the remaining columns in the apparatus. Thus in FIGURE 1, column 16 may be removed and the analysis continued in column 17, etc.

The removed column 21 (equivalent to 16) is then inserted into the purge gas valve 20 of FIGURE 5, terminal outlet end 21b being introduced into the purge gas valve 20, and 21a being vented as shown. The insertion of the terminal end 21b of the column 21 opens the purge gas valve 20 thereby permitting the carrier gas from manifold line 11 to pass through the column 21 and purge the heavy ends of the hydrocarbon sample from the column. Upon completion of the purging, the column 21 is ready for the next analysis and may replace column 16 shown in FIGURE 1.

Referring to the purge gas valve 20 of FIGURE 5, the upper end of the chamber 67 is closed by plate 68 having the integral spring-receiving chamber 69 and sealed by means of gasket 70. The purge gas valve 20 also contains spring 71 and plug 72 and is constructed in the same manner as that described in connection with the valve-union of FIGURES 3 and 4.

When the terminal 21b of the column 21 is withdrawn, the spring 71 forces the plug 72 onto the valve seat 73 thereby shutting off the purge gas flow. It should be understood that the purge gas flow may be separate from the carrier gas flow.

This improved apparatus greatly facilitates the cutting of columns from the system and permits operating such columns in series or alone. In addition, it provides a system for purging such colums without disturbing the flow of carrier gas through the system. Accordingly, I have attained the objects of the invention and have provided a novel system which is particularly useful in connection with gas chromatographic analysis.

Although the invention has been described with reference to preferred embodiments thereof, it is to be understood that these are by way of illustration only and that it is contemplated that modifications and variations in the apparatus and in the mode of using the apparatus can be made by those skilled in the art without departing from the spirit of the invention.

What I claim is:

1. In a gas chromatography system including a fluid inlet port communicating with a source of eluting gas, a valve-union device receiving said fluid inlet port and adapted for insertion of a chromatographic column, and a detector arranged to receive fluids discharged from said valve-union device, the improvement whereby said chromatographic column may be inserted or removed from said valve-union device while assuring flow of eluting gas to the detector whether the chromatographic column is in place or not, which improvement comprises a valve-union device comprising: a first axially elongated valve chamber, the fluid inlet port communicating to said chamber, a chromatographic column receiving port adapted to receive one end of a chromatographic column, said conduit-receiving port communicating at a first portion of said valve chamber, a bypass port at a second portion of said valve chamber, a plug means within said valve chamber axially movable to close said bypass port and permit flow of eluting gas through said conduit-receiving port and into said chromatographic column when a first end of said chromatographic column is inserted, means for urging said plug means to normally close said conduit-receiving port; a second axially elongated valve chamber, an inlet port to said second valve chamber communicating with the bypas port of the first valve chamber, a conduit-receiving port at a first portion of said second valve chamber, an outlet port at a second portion of said second valve chamber, said conduit-receiving port adapted to receive the other end of the chromatographic column, a plug means within said chamber axially movable to close said fluid inlet port and permit flow of fluid from said chromatographic column through said conduit-receiving port and out said outlet port when the other end of said chromatographic column is inserted, and means for urging said plug means to normally close said conduit-receiving port.

2. System of claim 1 including a plurality of such valve union devices.

3. System of claim 1 wherein said valve union device includes an adjustable flow restriction for said bypass port whereby the pressure drop through said bypass port can be adjusted to balance the pressure drop through the chromatographic column.

4. System of claim 1 wherein said plug means is a ball.

5. System of claim 1 wherein said plug means is a piston.

6. System of claim 1 wherein said plug means is a piston having a tapered portion.

7. In a gas chromatography system having a plurality of columns in series, the improvement which comprises valve-union means associated with at least one of said columns, said valve-union means comprising a housing, a pair of elongated chambers within said housing, the longitudinal axes of said chambers being substantially parallel, bypass channel means extending between said chambers, spring-loaded piston means in said chambers adapted to close said bypass channel means, said spring-loaded piston means comprising a generally cylindrical plug of self-lubricating inert plastic material, a guide stem integral with said plug and extending axially of said chamber, a coil spring about said stem within said chamber, and a spring guide means within said chamber and adapted to receive said spring and said stem when said plug is displaced longitudinally within said chamber from said entry port to said column ends hereinafter described, column entry port means at each of the adjacent ends of said chambers, said piston means normally closing said entry port means, a first gasiform fluid flow port in the first of said chambers, a second gasiform fluid flow port in the second of said chambers, a gas chromatographic column, said column having terminal ends with their axes arranged substantially parallel and in alignment with the said column entry ports, said ends being insertable within said chambers to displace said piston means and thereby close said bypass channel means and open said flow ports, and lateral port means in said column ends adapted to permit flow through said column and said first and second gasiform fluid flow ports in series.

References Cited in the file of this patent
UNITED STATES PATENTS

| | | |
|---|---|---|
| 1,505,850 | Benckenstein | Aug. 19, 1924 |
| 2,370,182 | Morrow et al. | Feb. 27, 1945 |
| 2,548,957 | Di Rosa | Apr. 17, 1951 |
| 2,631,001 | Griswold | Mar. 10, 1953 |
| 2,730,382 | De Mastri | Jan. 10, 1956 |
| 2,841,005 | Coggeshall | July 1, 1958 |
| 2,846,121 | Ronnebeck | Aug. 5, 1958 |

OTHER REFERENCES

Article: "Gas Partition Analysis of Light Ends in Gasolines," by Lichtenfels et al., published in Analytical Chemistry, vol. 28, September 1956.